(12) United States Patent
Steele et al.

(10) Patent No.: US 9,789,771 B2
(45) Date of Patent: Oct. 17, 2017

(54) SINGLE BATTERY ARCHITECTURE FOR ELECTRIFICATION VEHICLE

(71) Applicant: GM Global Technology Operations LLC, Detroit, MI (US)

(72) Inventors: Russell K. Steele, Clinton Township, MI (US); James F. Crawford, Macomb, MI (US); Alexander Bilinski, Avoca, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 209 days.

(21) Appl. No.: 14/695,844

(22) Filed: Apr. 24, 2015

(65) Prior Publication Data

US 2016/0311326 A1     Oct. 27, 2016

(51) Int. Cl.
*B60L 1/00*     (2006.01)
*B60L 11/18*     (2006.01)

(52) U.S. Cl.
CPC ........... *B60L 11/18* (2013.01); *Y02T 10/7005* (2013.01)

(58) Field of Classification Search
CPC ...................................................... B60L 11/18
USPC ........................................................ 307/10.1
See application file for complete search history.

(56) References Cited

U.S. PATENT DOCUMENTS

| | | | |
|---|---|---|---|
| 8,729,727 B2 | 5/2014 | Kim et al. | |
| 8,742,615 B2 | 6/2014 | Gopalakrishnan et al. | |
| 2010/0290592 A1 | 11/2010 | Yamada | |
| 2010/0305793 A1 | 12/2010 | Kidston et al. | |
| 2011/0202220 A1* | 8/2011 | Seta | B60L 1/00 701/22 |
| 2012/0056478 A1* | 3/2012 | Omoto | B60L 3/0046 307/11 |
| 2016/0039304 A1* | 2/2016 | Li | H02J 1/06 307/10.1 |

* cited by examiner

*Primary Examiner* — Jared Fureman
*Assistant Examiner* — Duc M Pham
(74) *Attorney, Agent, or Firm* — BrooksGroup (57) ABSTRACT

A product for use with a vehicle may include a high voltage electrical storage system unit. An energy storage unit may supply power to a high voltage wakeup module. The high voltage wakeup module may connect and may disconnect a number of loads from the energy storage unit when the vehicle is operating or shut down.

18 Claims, 5 Drawing Sheets

SINGLE BATTERY ARCHITECTURE FOR ELECTRIFICATION VEHICLE

TECHNICAL FIELD

The field to which the disclosure generally relates includes electric vehicles and more specifically, includes battery arrangements in electric vehicles.

BACKGROUND

Hybrid and electric vehicles typically include a traction motor that is powered by stored or generated electric energy. The traction motor typically operates at a relatively high voltage while other conventional vehicle systems operate at a relatively low voltage. Separate storage systems are generally provided to supply the different voltages.

SUMMARY OF ILLUSTRATIVE VARIATIONS

According to a number of variations a product for use with a vehicle may include a high voltage electrical storage system unit. An energy storage unit may supply power to a high voltage wakeup module. The high voltage wakeup module may connect and may disconnect a number of loads from the energy storage unit when the vehicle is operating or shut down.

Other variations may involve a product for use with a vehicle that may include an electric propulsion unit. An energy storage unit may be chargeable to store energy at a high voltage. A number of devices may be connected to the energy storage unit through a converter. The number of devices may operate at a low voltage that is significantly lower in magnitude than the high voltage. A wakeup module may be connected to the energy storage unit and may be configured to disconnect the electric propulsion unit from the energy storage unit. The wakeup module may be configured to separately disconnect the number of devices from the energy storage unit. The vehicle may not include a battery that operates at the low voltage.

Still other variations may involve a method for use with a vehicle. A high voltage electrical storage system unit may be provided. An energy storage unit may be provided in the high voltage electrical storage system unit. A high voltage wakeup module may be provided in the high voltage electrical storage system unit. Power may be supplied to the high voltage wakeup module from the energy storage unit. The high voltage wakeup module may be operated to disconnect a number of loads from the energy storage unit when the vehicle is shut down.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
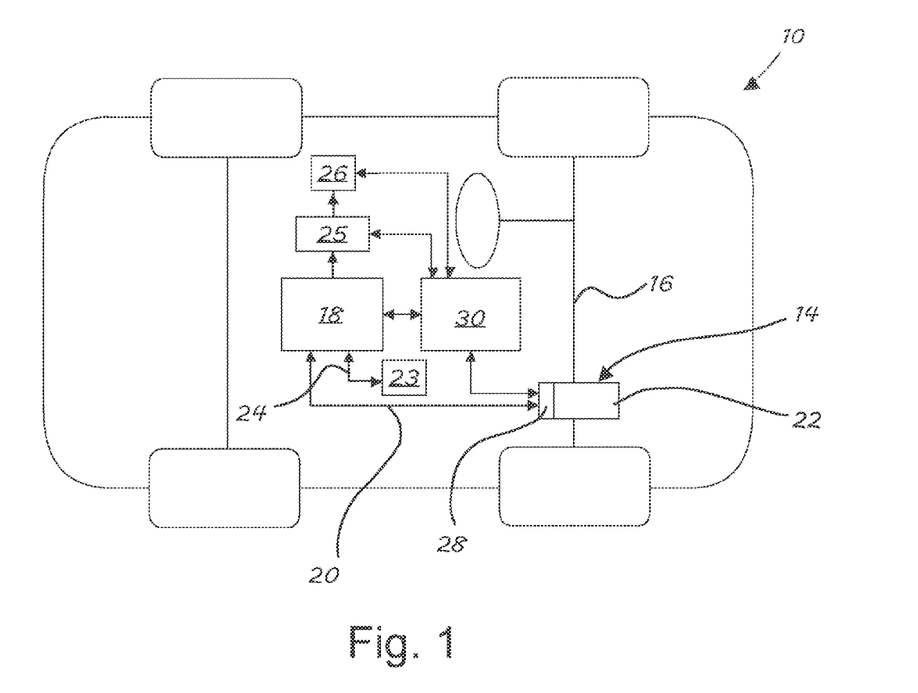
FIG. 1 is a schematic illustration of a vehicle according to a number of variations.

A number of variations may be described in relation to FIG. 1 which illustrates a simplified schematic view of a vehicle 10 having a torque machine which may be an electric propulsion unit 14. The electric propulsion unit 14 may be configured in a hybrid electric vehicle, a plug-in hybrid electric vehicle, an extended range electric vehicle, a battery electric vehicle, or any vehicle powertrain configuration that includes a torque machine. The electric propulsion unit 14 may be associated with a drive axle 16 and may provide torque to propel the vehicle 10. The vehicle 10 may employ multiple different circuit voltages that may range from a relatively low voltage to a relatively high voltage. Both alternating current (AC) and direct current (DC) circuits may be employed. In a number of variations, a low voltage circuit, system, device or machine may be one that operates in the general area of 10 to 14 volts, and a high voltage circuit, system, device or machine may be one that operates at voltage that is multiple times the magnitude of the voltage used in a low voltage circuit, system, device or machine, and may for example, involve 96, 144, 200 or several hundred volts.

A high voltage energy storage system 18 may provide power to the electric propulsion unit 14 through a high voltage circuit 20 and to other high voltage vehicle systems 23 through the high voltage circuit 24. The high voltage energy storage system may also provide low voltage through a DC to DC converter 25 to low voltage systems 26. The low voltage systems 26 may include various uses such as instrumentation, actuators and lighting. The high voltage energy storage system 18 may be charged by an external source when the vehicle 10 is parked.

The high voltage energy storage system 18 may be any suitable electrical energy storage system that may employ any of a variety of base forms to provide the required energy density, specific energy, power density, cost, and durability appropriate for the application. For example, energy may be stored through electrical, electrochemical, chemical, thermal or mechanical means. In a number of variations the high voltage energy storage system 18 may employ any suitable battery type known in the art. These batteries may use a type of lithium-ion, lead-acid, nickel-metal hydride, or any other composition known in the art.

The electric propulsion unit 14 may include one or more motor generator units 22 that may provide driving torque to the drive axle 16 and that may operate during deceleration to charge the high voltage energy storage system 18. In addition, the electric propulsion unit 14 may include power electronics 28 that may serve as the connection between the high voltage energy storage system 18 and the motor-generator units 22. The power electronics 28 may include a power inverter-converter unit. The power inverter-converter unit may invert DC current to AC current to supply the AC circuits of the vehicle 10 such as to drive the motor-generator units 22. The power electronics 28 may also include a DC to DC converter to step up the voltage supplied by the high voltage energy storage system 18 to a voltage value required by the inverter. The power electronics 28 may also include various sensors and circuits for monitoring, protection, filtering and control. During electric driving of the vehicle 10, the high voltage energy storage system 18 may provide energy to the motor-generator unit 22 through the power electronics 28. During braking or other vehicle operation when excess power is available, the motor-generator unit 22 may charge the high voltage energy storage system 18 through the power electronics 28.

A number of variations may include a control module 30 that communicatively connects with a number of elements in the vehicle 10. The control module 30 may connect with the high voltage energy storage system 18, the motor-generator units 22, the power electronics 28, and other various elements to monitor and control operation. The control module 30 represents, along with the power electronics 28, the control modules needed for the operation and control of the electric propulsion unit 14 and the high voltage energy storage system 18. Although the control module 30 is shown as one discrete element, the functions of the control module 30 may be provided by a number of intercommunicating modules that may be placed in various locations, which may include being integrated into various controlled units. Communication may be achieved through direct connections, a network bus, wireless connections, or other forms of interface. Referenced control modules, controllers, processors or similar terms may describe one or more of electronic circuits, processors, including associated memory and storage, executing one or more software or firmware programs, logic circuits, and other devices, along with other suitable components to provide the desired functionality. The control module 30 or other control device may operate according to a number of control algorithms, instructions and programs stored in memory and executed to provide various functions. Memory may be volatile or non-volatile and may be read-only, programmable, random access, hard drive, or other types.

Figure 2:
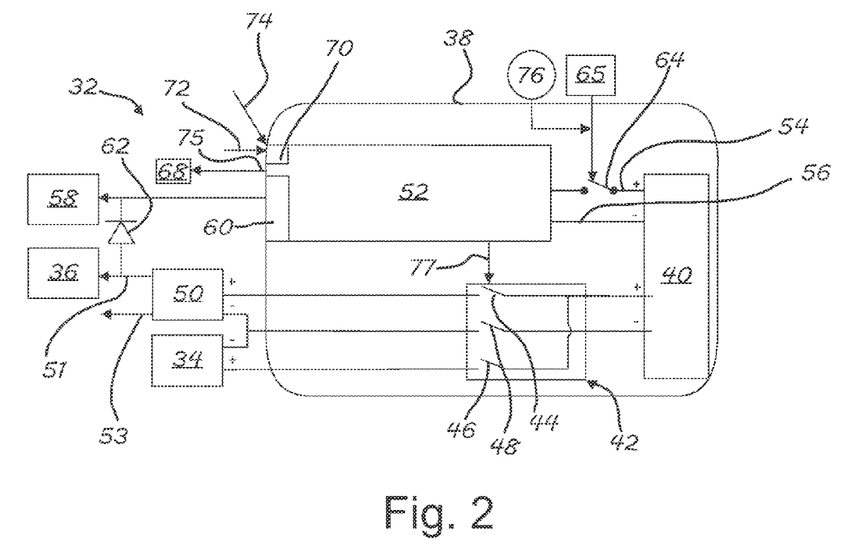
FIG. 2 is a diagrammatic illustration of a battery architecture according to a number of variations.

While the vehicle 10 may employ both low voltage and high voltage circuits, systems, devices and machines, only a high voltage energy storage system 18 may be provided. In a number of illustrative variations an electrical system 32 as illustrated in FIG. 2, may be useful in vehicle applications such as the vehicle 10 of FIG. 1, particularly those involving electrically driven high voltage devices 34 and electrically driven low voltage devices 36. The high voltage devices 34 may include an electric motor generator unit, such as the motor-generator unit 22 of FIG. 1. The low voltage devices 36 may include devices such as instrumentation, actuation and illumination such as the low voltage devices 26 of FIG. 1.

The electrical system 32 may include a high voltage energy storage system unit 38, which may be used as the high voltage energy storage system 18 of FIG. 1. The high voltage energy storage system unit 38 may contain a DC energy storage unit 40 that may be a number of battery cells such as lithium-ion cells, or may be provided in another form. The DC energy storage unit 40 may be connected with a high voltage contactor unit 42, which provides a mechanism to connect and disconnect the high voltage uses 34 and the low voltage uses 36 from the DC energy storage unit 40. The high voltage contactor unit 42 may employ either or both of positive and negative contacts, while in the simplified illustration of FIG. 2 both positive 44, 46 and negative 48 contacts are provided. When the high voltage contacts 44, 46, 48 are closed, voltage may be delivered directly to the high voltage devices 34. Voltage may be delivered to the low voltage devices 36 through a primary power module 50 that may convert high DC voltage to low DC voltage. The output from the primary power module 50 may be supplied to low voltage devices for which power supply interruption during a vehicle shutdown is acceptable. The primary power module 50 may provide multiple outputs 51, 53 at various different voltage levels depending on the requirements of the associated vehicle. The primary power module 50 may employ load shedding to manage power consumption by reducing the supply to various uses for which a lower power supply is acceptable at then current operating conditions. Elimination of a low voltage battery obviates low voltage charging and as a result, the primary power module may operate at lower voltage than is typical, such as ten volts. This may result in simplified low voltage electrical components.

The electrical system 32 may also include a high voltage wakeup module 52 that may be contained within the high voltage energy storage system unit 38. The high voltage wakeup module 52 may include voltage supply conductors including positive conductor 54 and negative conductor 56 from the DC energy storage unit 40. The voltage supplied through conductor 54 may be provided to select low voltage devices 58 for which a single point power supply through the primary power module 50 is not desired. A DC to DC converter 60 may be provided to convert high voltage to low voltage. The select low voltage devices 58 may include those that provide functions for which a redundant power supply is desirable. By interrupting the power supply to the select low voltage devices 58 in a vehicle-off mode that is controlled by the high voltage wakeup module 52 along with interruption of the low voltage devices 36, the parasitic load from the select low voltage devices 58 can be significantly reduced when the associated vehicle is powered down and the high voltage contacts 44, 46, 48 are opened. When the high voltage contacts 44, 46, 48 are closed, voltage may be supplied to the low voltage devices 58 from the primary power module 50 through a one way electrical device such as indicated by a PN junction diode 62. Although the high voltage wakeup module 52 is shown as one discrete device, a number of intercommunicating modules may be employed to provide the required functions.

The high voltage wakeup module 52 may maintain the supply of voltage to devices 68 which may be non-volatile devices, but may selectively interrupt the supply such as after an interim period during a routine shutdown or during a long term storage event. The high voltage wakeup module 52 may enable interruption of the voltage supply conductor 54 from the DC energy storage unit 40 during a routine vehicle shutdown through a switching device such as a solid state relay. During a long term storage vehicle shut down, the high voltage wakeup module 52 may initiate disconnection of the voltage supply conductor 54 by opening of a separate switching device 64 through a signal 65. The signal 65 may be communicated from the high voltage wakeup module 52 through a conductor or wirelessly. The high voltage wakeup module 52 may include a radio frequency receiver or receivers 70 responsive to one or more radio frequency signals such as delivered from a remote operating key fob signal 72 or through a cellular system signal 74, which may be employed by an OnStar® service. The cellular system signal 74 may be employed to place the electrical system 32 in long term storage mode if desired. The high voltage wakeup module 52 may be responsive to other discrete signals 76 such as signals from other vehicle systems that may employ a separate wakeup process, or operations such as the opening of a vehicle door or an ignition switch accessory position on operation. According to a number of variations the primary power module 50 may be powered during an ignition accessory position on operation. When an input initiates the high voltage wakeup module 52 to establish voltage supply, a vehicle wakeup output signal 75 may be supplied to various devices 68 and a signal 77 may be sent to the high voltage contactor unit 42 to close the contacts 44, 46, 48.

Figure 3:
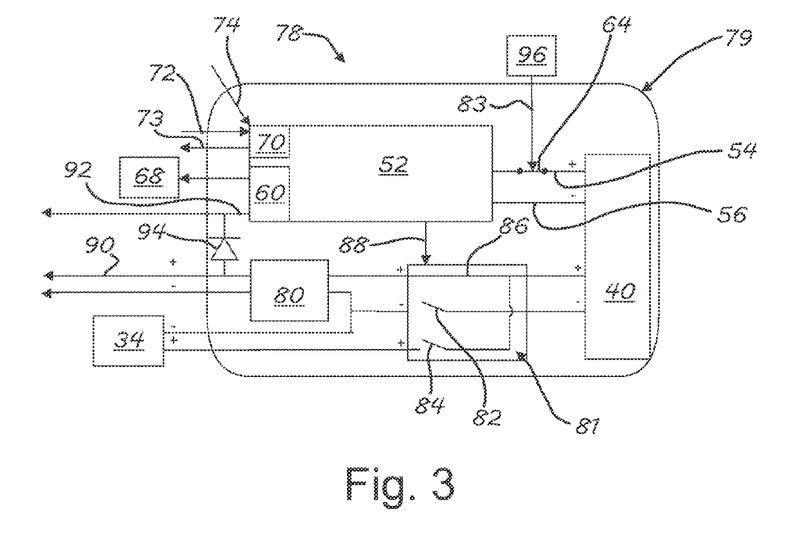
FIG. 3 is a diagrammatic illustration of a battery architecture according to a number of variations.

A number of additional variations may be described in relation to FIG. 3 which illustrates an electrical system 78. Elements in FIG. 3 that are like elements in FIG. 2, are given the same reference number and the description provided above applies. The electrical system 78 may include a high voltage energy storage system unit 79. The high voltage energy storage system unit 79 may employ the DC energy storage unit 40, and the high voltage wakeup module 52 as described in relation to FIG. 2. An integrated primary power module 80 may be included within the high voltage energy storage system unit 79 and may convert high DC voltage to low DC voltage. The integrated primary power module 80 may receive power from the DC energy storage unit 40 through a high voltage contactor unit 81. The high voltage contactor unit 81 may include contacts 82 and 84 to switch the positive pole on the high voltage devices 34 through contact 84 and the negative poles on both the high voltage devices 34 and the integrated primary power module 80 through the contact 82. The positive pole of the integrated primary power unit 80 may remain energized through the conductor 86. The high voltage wakeup module 52 may communicate a signal 88 to the high voltage contactor unit 81 to initiate actuate the contacts 82, 84. The low voltage output 90 from the integrated primary power unit 80 may be connected to the low voltage output 92 from the high voltage wakeup module 52 through a one way device 94 represented by an integrated PN junction diode. The high voltage wakeup module 52 may incorporate a DC to DC converter 60 to reduce the voltage from the DC energy storage unit 40 to the low voltage output 92. In the high voltage energy storage system unit 79, the switching device 64 is shown in a closed position which may result from an input 83 to wake up from long term storage. The input 83 may be provided through a number of options including closure of a switch 96 such as closure of the associated vehicle's ignition switch which may be passively or manually actuated.

Figure 4:
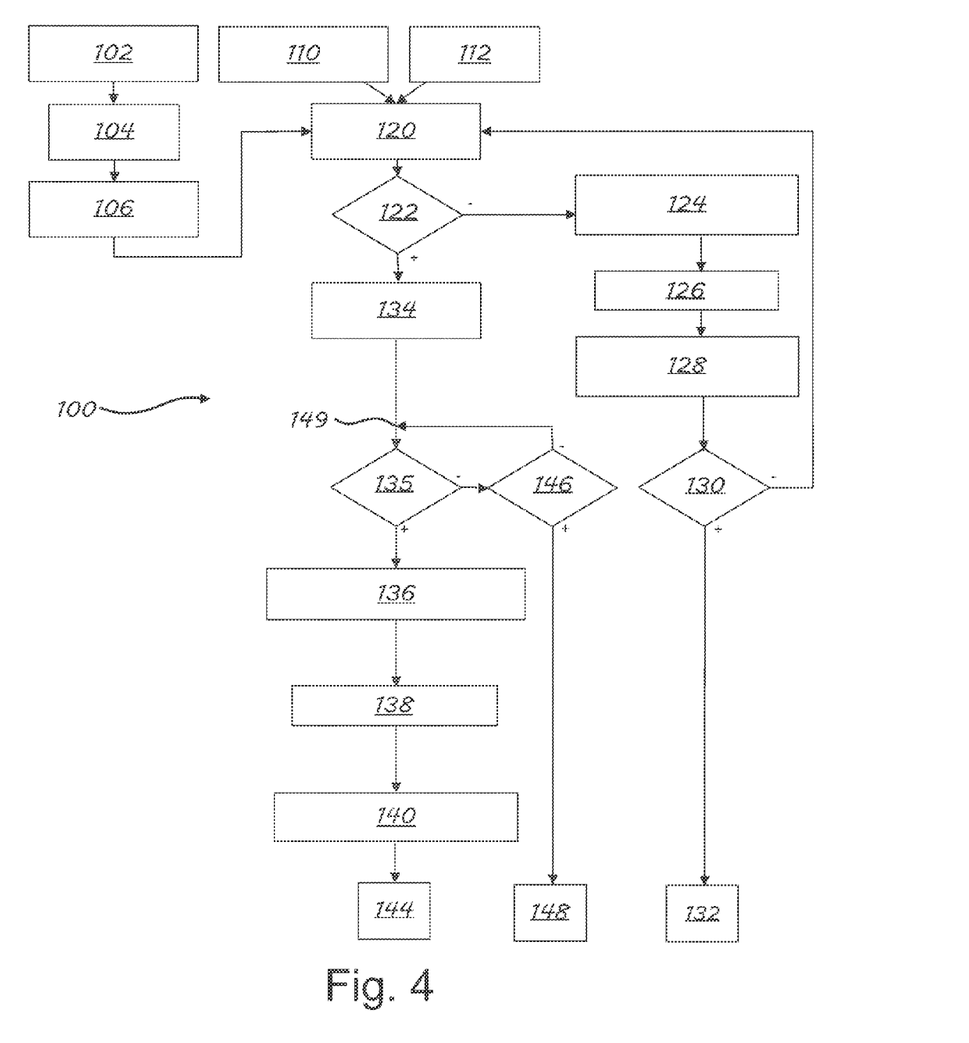
FIG. 4 is a flow chart of a startup process according to a number of variations.

In a number of variations, operation of the high voltage wakeup module 52 may be described in relation to FIG. 4 which depicts a startup operation 100 in the form of a schematic flow chart. The startup operation 100 will be described in association with the electrical system 32 of FIG. 2 and the elements described therewith, but is applicable to other electrical systems. In the event of a desire to wake up from a long term storage event, a wakeup step 102 may be provided in response to a signal or switch, which may be a passive or manual ignition switch, a cellular system signal, or another activation source. From the wakeup step 102, the startup operation 100 may proceed to step 104 where high voltage supply from the DC storage unit 40 may be enabled to the high voltage wakeup module 52 through closure of the switching device 64. Proceeding to step 106, the voltage supply to the non-volatile devices 68 through the vehicle wakeup output signal 75 are provided from the high voltage wakeup module 52. From step 106, the startup operation 100 may proceed to step 120.

In cases where the electrical system 32 is not in a long term storage event, the startup operation 100 may arrive at step 120 from either a signal step 110 or an initiation step 112. At the signal step 110, a radio frequency signal may be received by the radio frequency receivers 70 to initiate the startup operation 100. The signal may be provided by any of a number of radio frequency devices such as remote fobs, cellular devices or other RF devices, which may involve internet connected devices. From signal step 110, the startup operation 100 may proceed to step 120. Alternatively, at the initiation step 112, a discrete wake up input may be provided from any of a number of sources such as opening of a vehicle door, turning an ignition switch to an on position, or another activity. From initiation step 112, the startup operation 100 may proceed to step 120.

At step 120, a battery monitor may be used to measure the state of charge of the DC energy storage unit 40. The startup operation 100 may then proceed to step 122 where the measured state of charge is compared to a preferred state of charge. If the measured state of charge is within an acceptable range, the startup operation 100 may proceed to step 124 where a signal is sent by the high voltage wakeup module 52 to enable the select low voltage devices 58. The startup operation may proceed to step 126 where a signal is sent by the high voltage wakeup module 52 to enable the primary power module 50. From step 126 the startup operation may proceed to step 128 where the high voltage wakeup module 52 sends a signal to the high voltage contactor unit 42 and the contacts 44, 46, 48 are closed enabling power to the primary power module 50 and to the high voltage devices 34. With the vehicle awakened, an ignition input at step 130 may be provided by the vehicle's operator. In a vehicle with an internal combustion engine, an engine crank operation may ensue and the vehicle is placed in run mode 132. In a vehicle without an internal combustion engine, the electric propulsion unit 14 may be placed in run mode 132 and the vehicle may be shifted into gear. In the case of either a failure to start the internal combustion engine or an error occurs in placing the electric propulsion unit 14 into run mode, the startup operation 100 may return to step 120 and the process through step 122 may be repeated.

Returning to step 120, if the state of charge of the DC energy storage unit 40 is not within an acceptable range, the startup operation 100 may proceed to step 134 where a low state of charge error message may be recorded in the control module 30 and an indicator may be activated in the vehicle's instrument panel. An input by the vehicle's operator with a request to crank the vehicle's engine or start the vehicle may be provided at step 135. If the engine is successfully cranked or startup initiation is successfully energized, the startup operation may proceed to step 136 where a signal may be sent by the high voltage wakeup module 52 to enable the select low voltage devices 58. The startup operation may proceed to step 138 where a signal may be sent by the high voltage wakeup module 52 to enable the primary power module 50. From step 138 the startup operation may proceed to step 140 where the high voltage wakeup module 52 may send a signal to the high voltage contactor unit 42 and the contacts 44, 46, 48 may be closed enabling power to the primary power module 50 and to the high voltage devices 34. With the vehicle awakened, the ignition input at step 135 may be successful and the vehicle is placed in run mode 144. By enabling the select low voltage devices 58 at step 136, after an engine crank request at step 135, stored energy savings may be maximized for cranking by holding the wakeup of systems until a request for crank is initiated.

In the case of either a failure to crank the internal combustion engine or an error occurs in placing the electric propulsion unit 14 into startup mode, the startup operation 100 may proceed to step 146. At step 146 a timer may be provided to time the ignition input event at step 135. If the timer records a magnitude equal or greater to a predetermined threshold time, the startup operation 100 proceeds to step 148 and the startup operation is shut down. If the timer records a magnitude less than the predetermined threshold time, the startup operation 100 returns to point 149 and another ignition input may be attempted at step 135.

Figure 5:
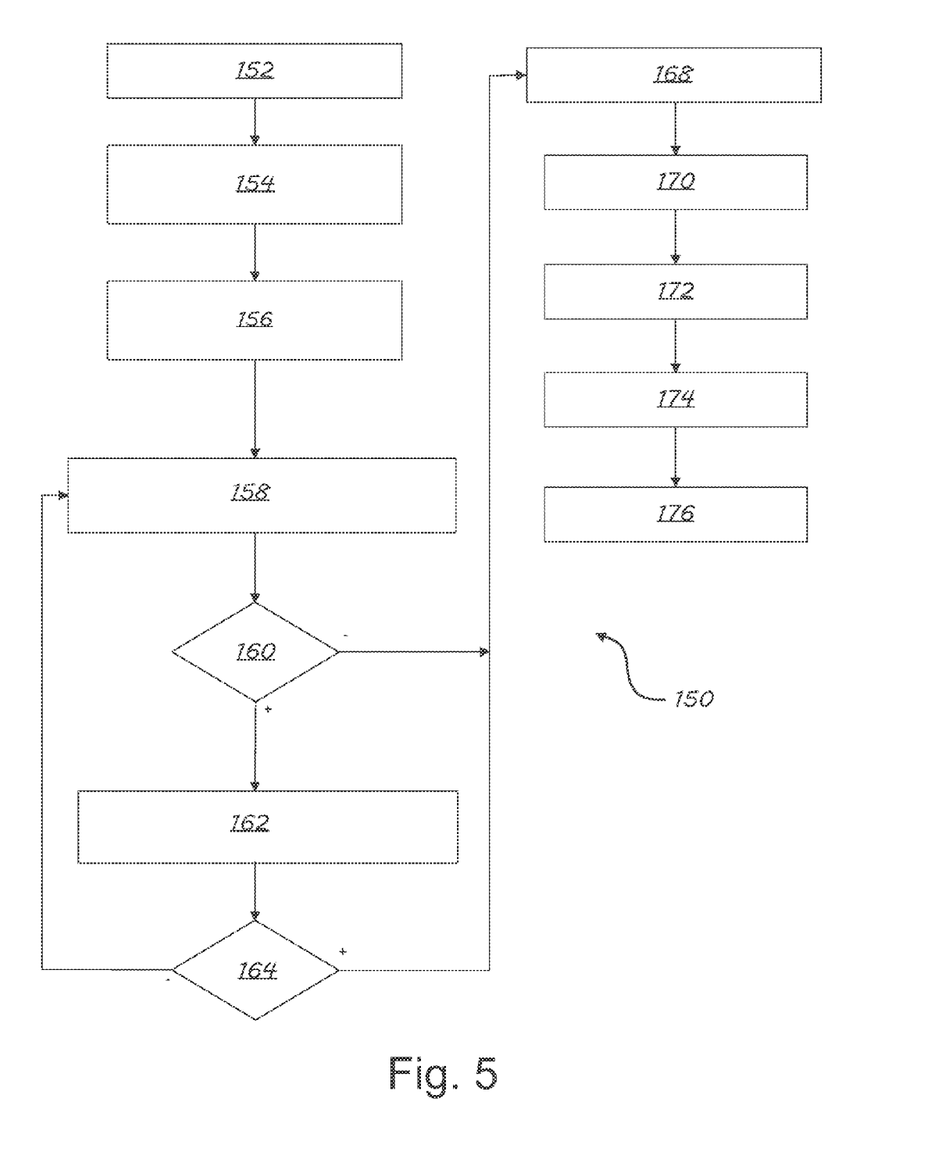
FIG. 5 is a flow chart of a shutdown process according to a number of variations.

In a number of additional variations, operation of the high voltage wakeup module 52 may be described in relation to FIG. 5 which depicts a shutdown operation 150 in the form of a schematic flow chart. The shutdown operation 150 will be described in association with the electrical system 32 of FIG. 2 and the elements described therewith, but also applies to other electrical systems such as the electrical system 78 of FIG. 3. The shutdown operation may be initiated at step 152 when the associated vehicle's ignition is turned off. From step 152 the shutdown operation 150 may proceed to step 154 where the non-volatile supply to the devices 68 is conditionally maintained. The shutdown operation 150 may proceed to step 156 where the power supply to the radio frequency receivers 70 is maintained to standby for a possible signal for a startup operation 100.

The shutdown operation 150 may proceed to step 158 where status of the select low voltage devices 58 may be monitored and then at step 160 a determination may be made as to whether maintaining the power supply to the select low voltage devices 58 is needed, such as based on ongoing functions of the vehicle. If the determination is affirmative, the shutdown operation proceeds to step 162 where the power supply to the select low voltage devices 58 is maintained by the high voltage wakeup module 52. A timer may be provided at step 164, where if the timer records a magnitude equal or greater than a predetermined threshold time, the shutdown operation 150 may proceed to step 168. If the timer records a magnitude less than the predetermined threshold time for maintaining the power supply, the shutdown operation 150 returns to step 158 and may proceed therefrom. If at step 160, it is determined that maintaining the power supply to the select low voltage devices 58 is not needed, the shutdown operation may proceed to step 168.

At step 168 the high voltage wakeup module 52 may deactivate the power supply to the select low voltage devices 58. The shutdown operation 150 may proceed to step 170 where the high voltage wakeup module 52 may disable the high voltage devices 34. The shutdown operation 150 may proceed to step 172 where the high voltage wakeup module 52 may disable the primary power module 50. The shutdown operation 150 may proceed to step 174 where the high voltage wakeup module 52 may send a signal to the high voltage contactor unit 42 and the contacts 44, 46, 48 may be opened after the loads have been disabled. The shutdown operation 150 may proceed to step 176 where the electrical system 32 is transitioned to an off mode.

Figure 6:
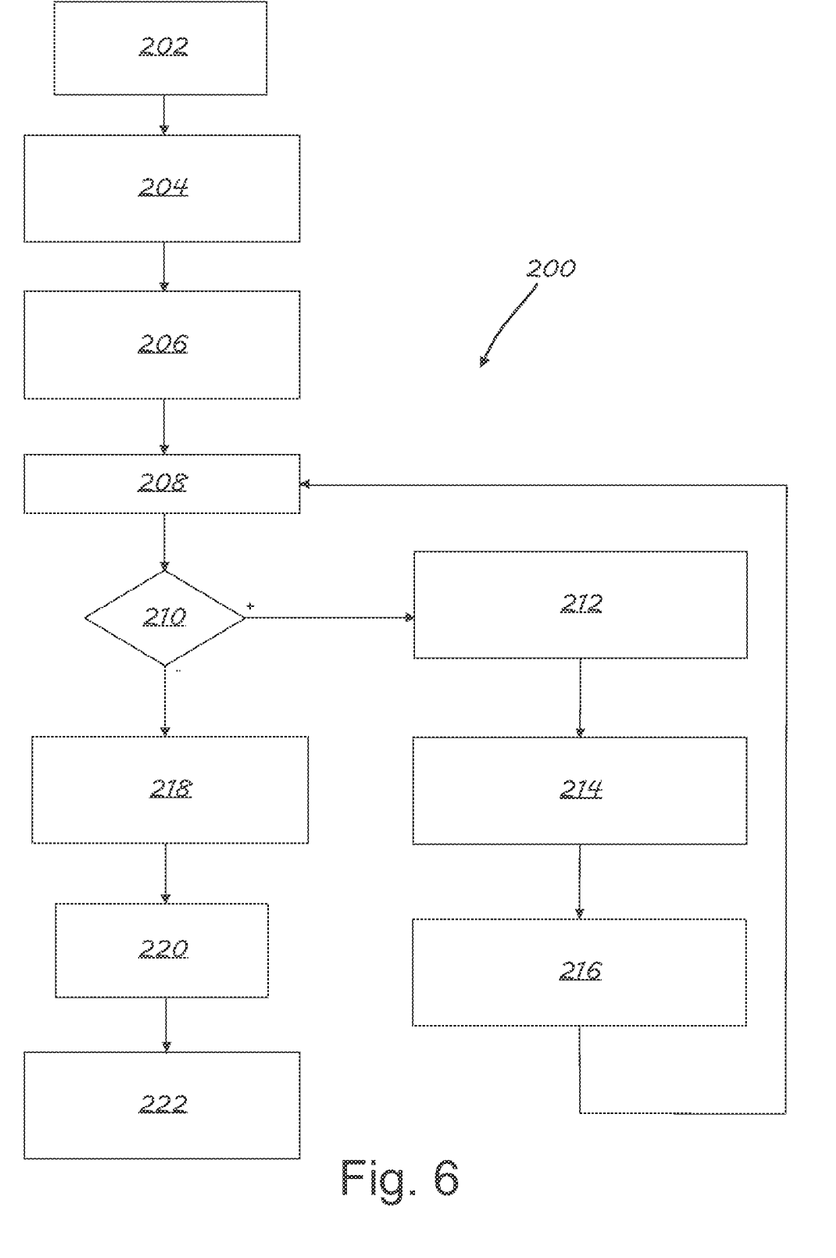
FIG. 6 is a flow chart of an off mode operation according to a number of variations.

In a number of additional variations, operation of the high voltage wakeup module 52 may be described in relation to FIG. 6 which depicts an off mode operation 200 in the form of a schematic flow chart. The off mode operation 200 will be described in association with the electrical system 32 of FIG. 2 and the elements described therewith, but also applies to other electrical systems such as the electrical system 78 of FIG. 3. Following shutdown such as after the shutdown operation 150, the electric system 32 may be in the off mode at step 202. In the off mode operation 200, the power supply to the non-volatile devices 68 may be maintained at step 204 and the power supply to the radio frequency receivers 70 may be maintained at step 206. The off mode operation 200 may proceed to step 208 where the state of charge of the DC energy storage unit 40 may be measured. At step 210 the measured state of charge may be compared to a predetermined threshold state of charge that is sufficient to start the vehicle. If the measured state of charge is greater than the predetermined threshold, the off mode operation 200 may proceed to step 212. At step 212 a low power draw operation state may be initiated where state of charge monitoring is suspended. A timer may be provided at step 214 set at a predetermined interval to proceed to step 216 where the state of charge monitor is awakened. From step 216 the off mode operation 200 may return to step 208 and the state of charge loop of steps 208, 210, 212, 214 and 216 may be repeated at the predetermined intervals.

During state of charge monitoring if the state of charge measured is at or below the predetermined threshold, the off mode operation 200 may proceed from step 210 to step 218. At step 218 the high voltage wakeup module 52 may interrupt the power supply to the non-volatile devices 68 and the off mode operation 200 may proceed to step 220. At step 220 the high voltage wakeup module 52 may interrupt its own power supply by sending a signal 65 to open the switching device 64. At step 222 all high voltage current drain from the DC energy storage system 40 is eliminated and the electric system 32 is in long term storage mode. The state of charge may be maintained at a level where startup of the vehicle is possible and the startup operation 100 may be initiated from wakeup step 102 of FIG. 4.

Through the described variations a vehicle electrical architecture may operate without a low voltage battery. The following description of variants is only illustrative of components, elements, product and methods considered to be within the scope of the invention and are not in any way intended to limit such scope by what is specifically disclosed or not expressly set forth. The components, elements, products and methods as described herein may be combined and rearranged other than as expressly described herein and still are considered to be within the scope of the invention.

Variation 1 may involve a product for use with a vehicle. A high voltage electrical storage system unit may have an energy storage unit that supplies power to a high voltage wakeup module. The high voltage wakeup module may disconnect a number of loads from the energy storage unit when the vehicle is shut down.

Variation 2 may include the product according to variation 1 wherein the energy storage unit may be a high voltage battery. The vehicle may include a number of devices operating on a low voltage. The number of devices may be supplied with power from the high voltage battery through a converter. The vehicle may not include a low voltage battery.

Variation 3 may include the product according to variation 1 or 2 wherein the high voltage wakeup module may be located in the high voltage electrical storage system unit.

Variation 4 may include the product according to any of variations 1 through 3 wherein an electric propulsion unit may be adapted and arranged to propel the vehicle. A high voltage contactor unit may be positioned in the high voltage electrical storage system unit. The high voltage contactor unit may be adapted and arranged to selectively disconnect the electric propulsion unit from the energy storage unit in response to a signal from the high voltage wakeup module.

Variation 5 may include the product according to variation 4 wherein a switching unit may be connected in a power supply conductor located between the energy storage unit and the high voltage wakeup module. The switching unit may be responsive to the high voltage wakeup module to disconnect the power supply conductor, de-energizing the high voltage wakeup module.

Variation 6 may include the product according to any of variations 1 through 5 and may include a primary power module that may supply power from the energy storage unit to a number of low voltage devices through a first output. The high voltage wakeup module may supply power from the energy storage unit to a select group of low voltage devices through a second output. The first output may be connected to the second output through a one-way electrical device so that power may flow from the first output to the second output. Power may not flow from the second output to the first output.

Variation 7 may include the product according to variation 6 wherein the primary power module and the one-way electrical device may be located in the high voltage electrical storage system unit.

Variation 8 may include the product according to variation 7 wherein the primary power module may be directly connected to the energy storage unit through a conductor that is not switched.

Variation 9 may include the product according to any of variations 1 through 8 and may include a radio frequency receiver unit positioned in the high voltage wakeup module to initiate actions of the high voltage wakeup module through a received signal.

Variation 10 may involve a product for use with a vehicle that may include an electric propulsion unit. An energy storage unit may be chargeable to store energy at a high voltage. A number of devices may be connected to the energy storage unit through a converter. The number of devices may operate at a low voltage that is significantly lower in magnitude than the high voltage. A wakeup module may be connected to the energy storage unit and may be configured to disconnect the electric propulsion unit from the energy storage unit. The wakeup module may be configured to separately disconnect the number of devices from the energy storage unit. The vehicle may not include a battery that operates at the low voltage.

Variation 11 may include the product according to variation 10 wherein a high voltage contactor unit may be connected between the electric propulsion unit and the energy storage system. The wakeup module may disconnect the electric propulsion unit from the energy storage unit by sending a signal to the high voltage contactor unit. The high voltage contactor unit may open in response to the signal.

Variation 12 may include the product according to variation 10 or 11 wherein a primary power module may provide a first low voltage output to a first subset of the number of devices. The wakeup module may provide a second low voltage output to a second subset of the number of devices. A one-way electrical device may be connected between the first output and the second output so that the primary power module provides a redundant power supply to the second subset of the number of devices. The wakeup module may not provide power to the first subset of the number of devices.

Variation 13 may include the product according to any of variations 10 through 12 wherein a radio frequency receiver unit may be positioned in the wakeup module to initiate actions of the wakeup module through a signal received by the radio frequency receiving unit.

Variation 14 may involve a method for use with a vehicle. A high voltage electrical storage system unit may be provided. An energy storage unit may be provided in the high voltage electrical storage system unit. A high voltage wakeup module may be provided in the high voltage electrical storage system unit. Power may be supplied to the high voltage wakeup module from the energy storage unit. The high voltage wakeup module may be operated to disconnect a number of loads from the energy storage unit when the vehicle is shut down.

Variation 15 may include the method according to variation 14 wherein a startup of the vehicle may be initiated through a signal received by the wakeup module. The number of loads may be reconnected to the energy storage unit, and the vehicle may be started.

Variation 16 may include the method according to variation 14 or 15 wherein the number of loads may include a set of select loads. Shutdown of the vehicle may be initiated. A determination may be made as to whether power is required by the set of select loads. Power to the set of select loads may be maintained. If it is determined that power is required then the method may repeat determining whether power is required by the set of select loads, and if it is determined that power is not required the method may disable power to the select set of loads.

Variation 17 may include the method according to variation 16 wherein the vehicle may include an electric propulsion unit to which power may be disabled.

Variation 18 may include the method according to variation 17 wherein power may be disabled to the electric propulsion unit after disabling power to the select set of loads.

Variation 19 may include the method according to any of variations 14 through 18 wherein the number of loads may include a set of non-volatile loads. A state of charge of the energy storage unit may be determined. Power to the set of non-volatile loads may be disabled only if the determined state of charge is below a predetermined threshold.

Variation 20 may include the method according to variation 19 wherein the predetermined threshold may be set at a level sufficient to start the vehicle.

The above description of select variations within the scope of the invention is merely illustrative in nature and, thus, variations or variants thereof are not to be regarded as a departure from the spirit and scope of the invention.

What is claimed is:

1. A product for use with a vehicle comprising comprising a primary power module, a high voltage electrical storage system unit that has an energy storage unit, and a high voltage wakeup module wherein the energy storage unit supplies power to the high voltage wakeup module, wherein the primary power module may provide a first low voltage output to a first subset of a number of devices, and wherein the wakeup module may provide a second low voltage output to a second subset of the number of devices.

2. The product according to claim 1 wherein the energy storage unit is a high voltage battery and wherein the vehicle does not include a low voltage battery.

3. The product according to claim 1 wherein the high voltage wakeup module is located within the high voltage electrical storage system unit.

4. The product according to claim 3 further comprising an electric propulsion unit adapted and arranged to propel the vehicle, and a high voltage contactor unit positioned within the high voltage electrical storage system unit and wherein the high voltage contactor unit is adapted and arranged to selectively disconnect the electric propulsion unit from the energy storage unit in response to a signal from the high voltage wakeup module.

5. The product according to claim 4 further comprising a switching unit connected in a power supply conductor located between the energy storage unit and the high voltage wakeup module, the switching unit responsive to the high voltage wakeup module to disconnect the power supply conductor de-energizing the high voltage wakeup module.

6. The product according to claim 1 wherein the primary power module supplies power from the energy storage unit to a number of low voltage devices through a first output and wherein the high voltage wakeup module supplies power from the energy storage unit to a select group of low voltage devices through a second output and wherein the first output is connected to the second output through a one-way electrical device so that power flows from the first output to the second output but power does not flow from the second output to the first output.

7. The product according to claim 6 wherein the primary power module and the one-way electrical device are located within the high voltage electrical storage system unit.

8. The product according to claim 7 wherein the primary power module is directly connected to the energy storage unit through a conductor that is not switched.

9. The product according to claim 1 further comprising a radio frequency receiver unit positioned within the high voltage wakeup module to initiate actions of the high voltage wakeup module through a signal received by the radio frequency receiving unit.

10. A product for use with a vehicle that includes an electric propulsion unit, the product comprising:
an energy storage unit chargeable to store energy at a high voltage;
a number of devices connected to the energy storage unit through a converter, the number of devices operating at a low voltage that is lower in magnitude than the high voltage;
   a wakeup module connected to the energy storage unit, the wakeup module configured to disconnect the electric propulsion unit from the energy storage unit, and configured to separately disconnect the number of devices from the energy storage unit;
   a primary power module that provides a first low voltage output to a first subset of the number of devices and wherein the wakeup module provides a second low voltage output to a second subset of the number of devices, and further comprising a one-way electrical device connected between the first output and the second output so that the primary power module provides a redundant power supply to the second subset of the number of devices and wherein the wakeup module does not provide power to the first subset of the number of devices and, wherein the vehicle does not include a battery that operates at the low voltage.

11. The product according to claim 10 further comprising a high voltage contactor unit that is connected between the electric propulsion unit and the energy storage system and wherein the wakeup module disconnects the electric propulsion unit from the energy storage unit by sending a signal to the high voltage contactor unit wherein the high voltage contactor unit opens in response to the signal.

12. The product according to claim 10 further comprising a radio frequency receiver unit positioned within the wakeup module to initiate actions of the wakeup module through a signal received by the radio frequency receiving unit.

13. A method for use with a vehicle comprising:
providing a high voltage electrical storage system unit;
providing an energy storage unit in the high voltage electrical storage system unit;
providing a high voltage wakeup module in the high voltage electrical storage system unit;
supplying power to the high voltage wakeup module from the energy storage unit;
operating the high voltage wakeup module to disconnect a number of loads from the energy storage unit when the vehicle is shut down;
wherein the number of loads includes a set of select loads, and further comprising: initiating a shutdown of the vehicle; determining whether power is required by the set of select loads; maintaining power to the set of select loads if it is determined that power is required and determining again whether power is required by the set of select loads; and disabling power to the select set of loads if it is determined that power is not required.

14. The method according to claim 13 further comprising initiating a startup of the vehicle through a signal received by the wakeup module; reconnecting the number of loads to the energy storage unit; and
starting the vehicle.

15. The method according to claim 14 wherein the vehicle includes an electric propulsion unit and further comprising disabling power to the electric propulsion unit.

16. The method according to claim 15 wherein power is disabled to the electric propulsion unit after disabling power to the select set of loads.

17. The method according to claim 13 wherein the number of loads includes a set of non-volatile loads and further comprising determining a state of charge of the energy storage unit, and disabling power to the set of non-volatile loads only if the determined state of charge is below a predetermined threshold.

18. The method according to claim 16 further comprising setting the predetermined threshold at a level sufficient to start the vehicle.

\* \* \* \* \*